United States Patent [19]

Okamoto et al.

[11] 4,043,037
[45] Aug. 23, 1977

[54] CORD-TYPE MOWING TOOL

[75] Inventors: Tatsuo Okamoto, Yokosuka; Masat Nogawa, Yokohama; Nobuyoshi Okabe, Musashino, all of Japan

[73] Assignee: Kioritz Corporation, Tokyo, Japan

[21] Appl. No.: 732,588

[22] Filed: Oct. 14, 1976

[30] Foreign Application Priority Data

Oct. 15, 1975 Japan ............................ 50-139406[U]

[51] Int. Cl.² ..................... A01D 55/18; B27B 27/00
[52] U.S. Cl. ........................................ 30/276; 56/12.7
[58] Field of Search ................... 30/276, 347; 56/12.7, 56/295

[56] References Cited

U.S. PATENT DOCUMENTS

| | | | |
|---|---|---|---|
| 2,115,265 | 4/1938 | Jennett | 30/276 |
| 2,663,137 | 12/1953 | Asbury | 56/12.7 |
| 3,708,967 | 1/1973 | Geist et al. | 56/12.7 |
| 3,859,776 | 1/1975 | Ballas et al. | 56/12.7 |

FOREIGN PATENT DOCUMENTS 1,281,450 12/1961 France ................... 56/12.7

*Primary Examiner*—Jimmy C. Peters
*Attorney, Agent, or Firm*—Karl W. Flocks

[57] ABSTRACT

A cord-type mowing tool having a cutter body formed with at least one radially extending bore for receiving a cord serving as a grass cutting blade, and a clamping member fitted in the central bottom opening of the cutter body for forcing against the central portion of the cutter body an end portion of the cord inserted in the radially extending bore to hold the cord in place. The clamping member is threadably connected to the cutter body, so that by loosening and tightening the threadable connection it is possible to readily replace the old cord by a new cord of a predetermined length. The grass cutting tool is simple in construction, light in weight and reliable in performance.

1 Claim, 3 Drawing Figures

CORD-TYPE MOWING TOOL

This invention relates to a cord-type mowing tool which uses a cord as a blade for cutting down grasses or weeds by rotating the cord.

The present practice in the field of cord-type mowing tools is to use a reel for winding a cord thereon and paying out the cord in a radial direction for rotation at high speed, so that the cord will become rigid radially due to centrifugal forces and serve as a blade for cutting grasses and weeds. When the length of cord being used as a blade is worn or damaged, an additional length of cord can be paid out from the reel to replace the damaged length of cord. Thus, the cord-mowing tools using a reel are convenient for use in cutting grasses on field or lawn of a large area, but there is no need to use a reel in cutting grasses on a small strip of land or garden. Moreover, the cord-type mowing tools using a reel are expensive, and the operator in inconvenienced by having to carry with him equipment which is not needed.

An object of this invention is to provide a cord-type mowing tool which eliminates the use of a reel and which uses a clamping member for forcing an end portion of a cord against a cutter body to hold the cord in place, so that it is possible to replace the old cord serving as a blade by a new cord of a predetermined length merely by turning the clamping member.

Another object of the invention is to provide a cord-type mowing tool of simple construction and low cost to contribute to the popularization of this type of mowing tool which has recently been put to use for cutting grasses and weeds, so that the range of use of a mowing machine can be increased and the mowing machine can be used with increased safety.

The outstanding characteristic of the invention is that at least one cord of a predetermined length can be fitted in a radially extending bore formed in a cutter body and held in place by means of a clamping member threadably inserted in a bottom opening formed in the cutter body, whereby the aforementioned disadvantages of the prior art can be eliminated and the weight of the cutter body itself can be reduced.

Figure 1:
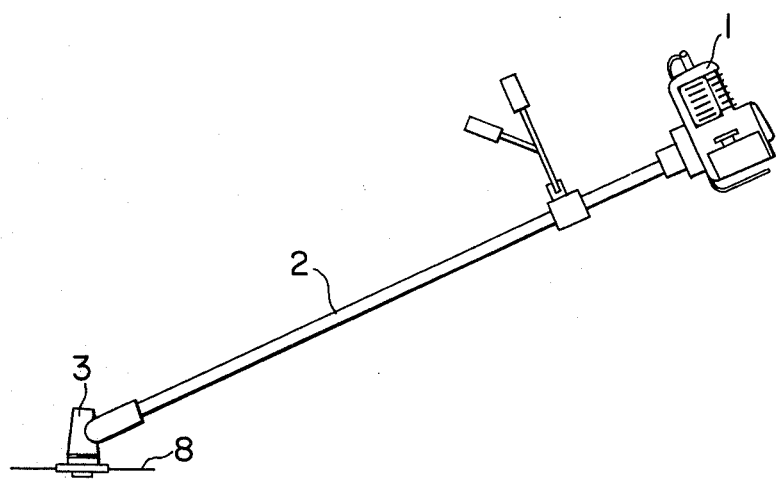
FIG. 1 is a side view of a mowing machine.

A cord serving as a grass cutting blade according to this invention is supplied in a predetermined length and is disposable. FIG. 1 shows a mowing machine of the type with which the cord-type mowing tool according to the invention can be used with advantage. As shown, the mowing machine includes an engine 1 attached to one end of an elongated hollow rod 2 in which a power transmitting shaft is inserted. The rod 2 has connected to the other end thereof a cord-type mowing tool according to the invention which is connected to a vertically disposed rotary shaft 4 connected to the power transmitting shaft through a gearing 3, so that as the rotary shaft 4 rotates at high speeds grass cutting blades 8 connected to the moving tool also rotate to cut grasses or weeds. Thus, a grass cutting operation can be performed by holding the elongated rod 2 and moving the mowing tool to and fro.

One embodiment of the cord-type mowing tool according to the invention will be described with reference to FIG. 2 and FIG. 3. The cord-type mowing tool comprises a cutter body 5 formed in the center of its top wall with an upper opening 6 for inserting the rotary shaft 4 therein to thereby attach the mowing tool to the mowing machine. The cutter body 5 is formed at its periphery with a flange 7 in which at least one or generally a plurality of radially extending bores 9 are formed for receiving cords 8 therein, so that the cords 8 may extend radially of the cutter body 5.

Figure 3:
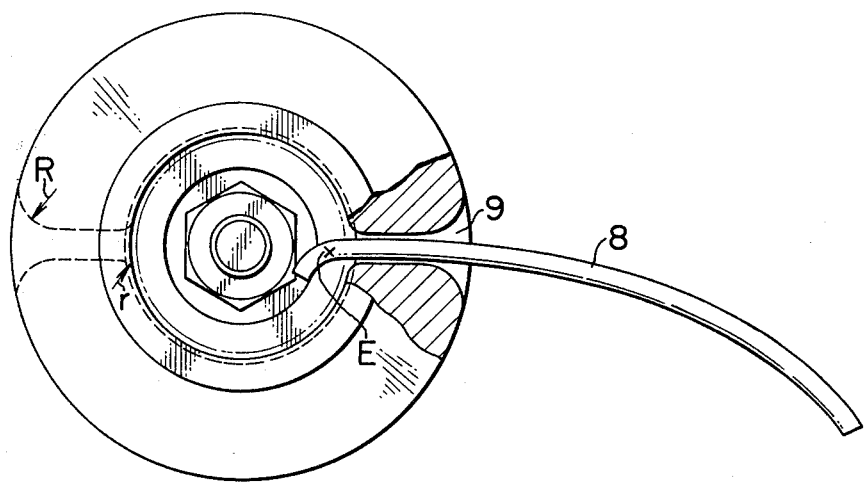
FIG. 3 is a bottom plan view of the cord-type mowing tool shown in FIG. 2, with the clamping member being removed.

As can be seen in FIG. 3, each of the radially extending bores 9 is formed such that, in order to lighten the shearing force exerted on the cords 8 while in service, one end portion of the bore 9 is provided with a pressure receiving curved surface R and the other end portion thereof is provided with a pressure receiving curved surface r. The pressure receiving curved surfaces are formed horizontally in a direction in which the cord 8 is bent. By this arrangement, vibration of the cord 8 can be prevented, less wear is caused on the cord 8 and the service life of the cord 8 can be increased.

Figure 2:
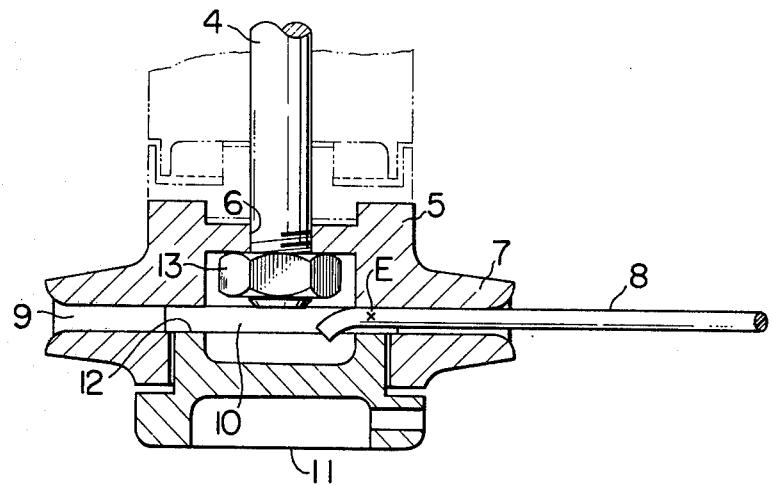
FIG. 2 is a vertical sectional view of the cord-type mowing tool comprising an embodiment of this invention.

Referring to FIG. 2, a bottom opening 10 is formed in the cutter body 5 and disposed below the upper opening 6 to provide an inwardly extending annular ledge on an inner wall surface of the cutter body 5. The bottom opening 10 has an internally threaded portion on its side wall. A clamping member 11 having an upper end portion 12 and having an externally threaded outer wall portion can be threadably fitted in the bottom opening 10, so that an end portion E of the cord 8 inserted in one of the radially extending bores can be forced by the upper end portion 12 of clamping member 11 against the annular ledge of the cutter body. Thus, the cord 8 can be held in place in the cutter body 5.

The cutter body 5 constructed as aforementioned can be attached to the end portion of the rotary shaft 4 by means of a nut 13. The cord 8 of a predetermined length is inserted in each of the radially extending bores 9 in a manner such that the end portion of each of the cords 8 is disposed below the central portion of the cutter body 5, and then the clamping member 11 is threadably inserted in the bottom opening 10. This automatically causes the upper end portion 12 of the clamping member 11 to force the end portions of the cords 8 tightly against the central portion of the cutter body 5, so that the cords 8 can be positively held in place. When the cords 8 are cut or worn, the clamping member 11 is loosened to permit the old cords to be withdrawn from the bores 9 and replaced by new ones.

The cutter body 5 can be made from a synthetic resinous material or other material which is light in weight, tough and low in cost. A cord made of a nylon base material which is commercially available can be used to provide the cords 8 by cutting it into cords of a predetermined length. Thus, it will be appreciated that the mowing tool cutter body according to this invention is constructed such that it can replace a disc-shaped cutting tool used nowadays with a mowing machine. When a disc-shaped cutting tool is used for cutting weeds growing near the fence or stone door, there is a danger of damaging flowering plants or the cutting tool being broken by being brought into contact with the stone. These disadvantages can be obviated by using a cord-type mowing tool, because the cords are free to change their form when they are brought into contact with a rigid body.

We claim:

1. A cord-type mowing tool comprising:

a cutter body formed in the center of its top wall with an upper opening for connecting the mowing tool to a mowing machine, said cutter body being further formed with a flange for forming therein at least one cord inserting bore extending radially of the cutter body and with an internally threaded central bottom opening disposed below said upper opening to provide an inwardly extending annular ledge on an inner wall surface of the cutter body;

a clamping member having an externally threaded portion and an upper end portion; and at least one cord inserted in said at least one cord inserting bore in a manner such that an end portion thereof is forced by the upper end portion of the clamping member tightly against the inwardly extending annular ledge of the cutter body when the clamping member is threadably fitted in the threaded central bottom opening, whereby the cord can be held in place in the cutter body to serve as a blade.

* * * * *